United States Patent Office 2,728,655
Patented Dec. 27, 1955

2,728,655
METHOD OF PRODUCING IRON POWDER WITH A LOW SILICA CONTENT

Nils Herman Brundin, Hoganas, Sweden, assignor to Höganäs-Billesholms Aktiebolag, Hoganas, Sweden, a company of Sweden No Drawing. Application January 21, 1952,
Serial No. 267,520

3 Claims. (Cl. 75—.5)

Iron powder used for powder metallurgical purposes must have as low impurity content as possible, since impurities make the powder harder to press and increase the wear on the pressing tools.

Due to their hardness compounds of quartz and silicic acid are particularly harmful. If therefore iron powder is produced by reducing iron ores, these have to be freed from siliceous minerals as far as possible, which in the case of magnetite ores is most easily achieved by means of magnetic separation after fine grinding.

Starting with a pure material pure iron powder can of course be produced if no impurities are introduced in the course of the reduction. There are three ways to avoid the introduction of impurities in the course of reduction.

1. By reducing with a gaseous reducing agent, e. g., hydrogen gas, carbon monoxide or a mixture of both.
2. By heating a mixture of iron oxide and solid reducing agent with low ash content, e. g. charcoal or petrol coke.
3. By heating iron oxide and reducing agent (which need not have low ash content), charged in layers.

Each of these three reducing methods has its drawbacks. The first two operate with relatively expensive reducing agents and in the third one charging is rather difficult; even reducing temperature has to be high in order to obtain reasonable reducing periods.

The cheapest possible method for producing iron powder by reducing iron oxide should be to heat a mixture of iron oxide and a cheap reducing agent containing ash; after grinding the sponge iron obtained the powder can be magnetically separated from the ash particles of the reducing agent. Yet, hitherto this method could not be practised as the reduced iron sticks to the ash particles so that magnetic separation does not give a pure enough powder.

The present invention offers a solution of the problem how to produce iron powder pure enough for powder metallurgical purposes by heating a mixture of iron oxide and a reducing agent of high ash content.

According to the invention the reduction is carried out by heating a mixture of pulverized iron oxide and the reducing agent, which latter also is present in the form of powder, but with considerably coarser grains, than the iron oxide, and preferably freed from the finest material. This will diminish the contact surface between the reduced iron and the ash particles remaining after the reducing agent is consumed, thus diminishing the possibility of ash particles sticking to the iron formed. A measure which contributes to a good result is to keep the reducing temperature as low as possible, preferably at or below 1000° C.

The following experiments show how the quality of the iron powder is improved by the invention.

Magnetite ore concentrate −30 mesh which as far as possible has been freed from impurities, is mixed with 19.2% of coke slack with an ash content of about 15%. In the ashes of the coke slack about 50% $SiO_2$ was found.

The coke slack used in the three experiments was of the following grain sizes:

(1) −20 mesh (<0.83 mm.)
(2) −20+80 mesh (0.83–0.19 mm.)
(3) −100 mesh (<0.15 mm.)

The three mixtures were reduced in a ceramic container by heating them to not more than 1000° C., which temperature was maintained until the reduction was completed. After this the sponge iron obtained was taken out and ground to −100 mesh (0.15 mm.) and separated magnetically. The $SiO_2$ contents before and after the magnetic separation were:

| | Grain size of the coke | Before magn. sep. | After magn. sep. |
|---|---|---|---|
| 1 | −20 mesh (0.83 mm.) | 2.62% $SiO_2$ | 0.42% $SiO_2$. |
| 2 | −20+80 mesh (0.83–0.19 mm.). | 2.14% $SiO_2$ | 0.21% $SiO_2$. |
| 3 | −100 mesh (<0.15 mm.) | 2.64% $SiO_2$ | 0.78% $SiO_2$. |

A comparison between cases 1 and 2 above shows that removal of the finest grains of coke leads to a considerable decrease in the $SiO_2$ content after magnetic separation.

The following table shows the importance of the reducing temperature, giving the $SiO_2$ content before and after magnetic separation of powder (−100 mesh) obtained by heating a mixture of iron ore concentrate and coke slack (−20 mesh) to various temperatures, after which the sponge iron was ground:

| Temperature | Before magn. sep. | After magn. sep. |
|---|---|---|
| 900° | 2.86% $SiO_2$ | 0.32% $SiO_2$. |
| 1,000° | 2.62% $SiO_2$ | 0.42% $SiO_2$. |
| 1,150° | 2.93% $SiO_2$ | 0.65% $SiO_2$. |

I claim:
1. Method for the production of iron powder which comprises mixing iron oxidic material in finely divided form with a solid, ash-containing carbonaceous reducing agent comprising grains of a larger grain size than the iron oxidic material and which is substantially free of particles of a grain size below about 80 mesh, heating the mixture to a temperature and for a time sufficient to complete the reduction of the iron oxidic material, said temperature being below the melting point of the iron formed by the reduction, cooling the resulting sponge iron, crushing the cooled sponge iron to the desired grain size and magnetically separating the iron content of the crushed sponge.

2. Method as defined in claim 1 in which the temperature does not exceed about 1000° C.

3. Method as defined in claim 2 in which the iron oxidic material is of a particle size less than 30 mesh and in which the reducing agent is of a particle size within the range from 20 mesh to 80 mesh.

References Cited in the file of this patent

UNITED STATES PATENTS

| | | |
|---|---|---|
| 126,922 | Blair | May 21, 1872 |
| 126,924 | Blair | May 21, 1872 |
| 432,383 | Eames | July 15, 1890 |
| 1,065,890 | Sieurin | June 24, 1913 |
| 2,085,178 | Acken | June 29, 1937 |

FOREIGN PATENTS

| | | |
|---|---|---|
| 878 | Great Britain | of 1874 |
| 105,352 | Australia | Oct. 13, 1938 |